Sheet 1-2 Sheets.

A. Frey.
Loom.

No. 1,387. Reissued Jan. 20, 1863.

Witnesses
Lemuel W. Serrell
Thos. Geo. Harold

Inventor.
A. Frey

A. Frey.
Loom.

No. 1,387. Reissued Jan. 20, 1863.

Witnesses
Lemuel W. Serrell
Thos. Geo. Harold

Inventor
A. Frey

UNITED STATES PATENT OFFICE.

ALEXANDER FREY, OF NEW YORK, N. Y.

IMPROVEMENT IN LOOMS.

Specification forming part of Letters Patent No. 32,245, dated May 7, 1861; Reissue No. 1,387, dated January 20, 1863.

*To all whom it may concern:*

Be it known that I, ALEXANDER FREY, of the city, county, and State of New York, have invented a new and useful Improvement in Looms; and I do hereby declare that the following is a full, clear, and exact description of the same, reference being had to the accompanying drawings, forming a part of this specification, in which—

Figure 1:
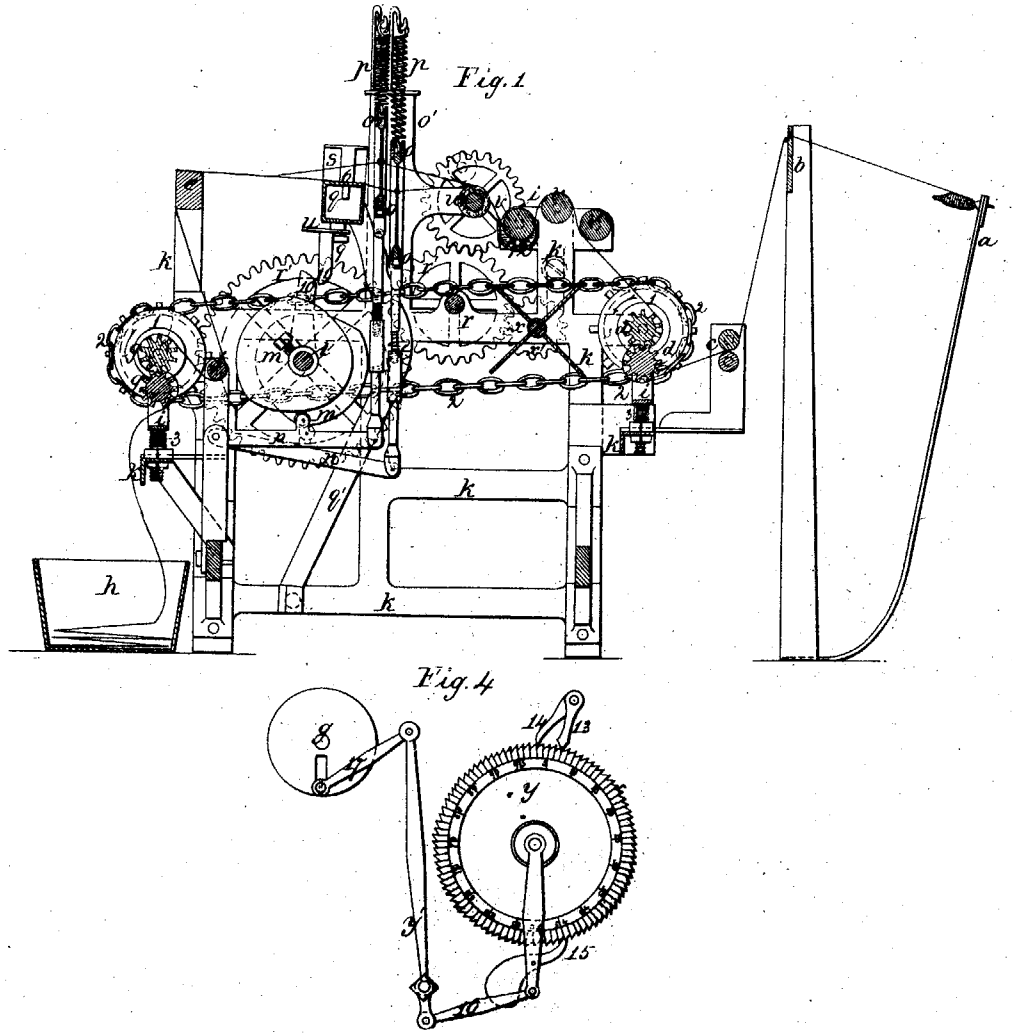
Figure 2:
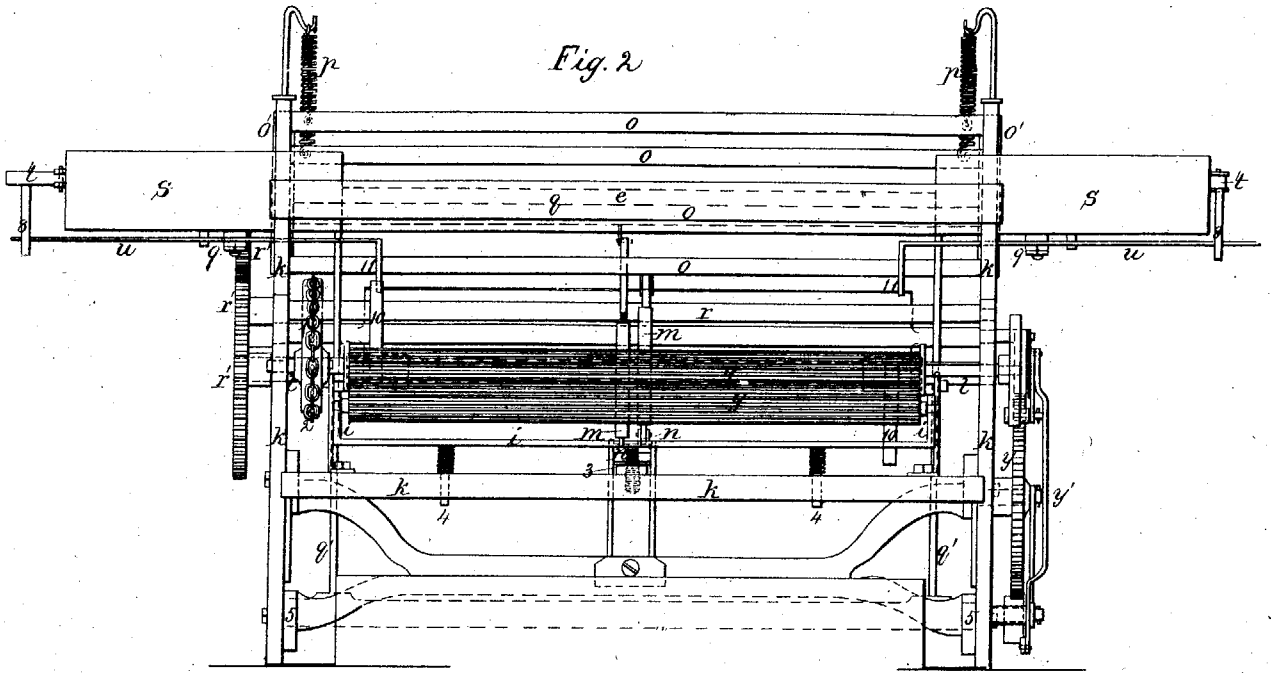
Figure 3:
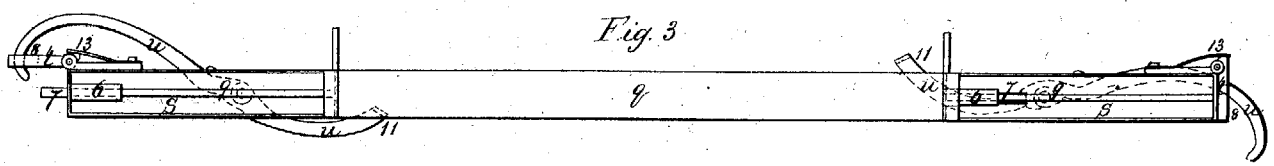

Figure 1 represents a longitudinal vertical section of my invention. Fig. 2 is a front elevation of the same. Fig. 3 is a plan of the lay detached. Fig. 4 is a detached elevation of the measuring apparatus.

Similar marks of reference in the several figures denote the same parts.

This invention consists in the employment or use of spool or cob carriers and thread-guides, in combination with a loom, in such a manner that the warp is led directly from spools or cobs into and through the loom, and that in case a thread breaks it can be drawn in and tied, independent of the other threads and without being subjected to an injurious strain.

It consists, further, in the application at the front and rear of the loom of pressing or fluted rollers connected together by chains, or any other equivalent means, so as to move in exact uniformity and arranged in place of the let-off and take-up rollers of ordinary looms, the warp and woven cloth or fabric being passed around and between these rollers in such a manner that by the action of said rollers a uniform strain is exerted on the material, and in consequence therefrom the desired uniformity in the weaving operation is effected.

The invention consists also in the employment of a peculiar device for driving the shuttle.

To enable others skilled in the art to make and use my invention, I will proceed to describe it with reference to the drawings.

The frame *k* of my loom is made of cast-iron or any other suitable material of sufficient strength and durability to sustain the several working parts of the mechanism required for weaving. A plate, *a*, of wood or sheet metal is secured to the floor on the rear of the frame, as clearly shown in Fig. 1 of the drawings, and this plate is perforated with any desired number of holes to receive spindles or carriers of spools or cobs containing the threads of which the warp is to be composed. This plate should stand slightly inclined, and the holes in the same are arranged in regular ranges or rows, and the threads on running from the cobs pass through suitable loops or guides, so that the same unwind evenly. Before the threads enter the loom they pass over or through a guide-plate, *b*, which is either provided with one or more ranges of holes or reeds, so that each single thread, or two, or any desired number of threads, can be passed through a separate hole, and the threads are thereby kept separate to any desired extent, so that if one of them should break during the operation of weaving it can easily be detected and the ends tied together.

In ordinary looms the warp is wound upon the beam, and thence it passes in mass through the loom, and if any thread breaks it has to be stretched sufficiently for tying.

With my improvement each single thread of the warp can be drawn in as much as desired without having any effect on its fibers or strength, and the ends of a broken thread can be tied together and the operation of weaving proceeded with without trouble, with little loss of time, and without injuring the texture or durability of the fabric.

From the guide-plate *b*, which retains the several warp-threads in the desired relative position toward each other, said threads pass through between the pair of guide-rollers *c*; or these rollers can be dispensed with and the warp passed directly from the guide-plate through the let off rollers *d d*. These rollers may be fluted and covered with cloth or any other suitable substance capable of exerting a firm hold on the warp-threads. The thread is passed under the lowest and through between the two rollers *d d*, and thence through the sizing apparatus, which is situated between the let-off rollers and the heddles. This apparatus consists of two guide-rollers, *v v*, and a roller, *v'*, in the sizing-trough 12, and a roller, *w*, over which the thread passes to the heddles. The roller *w* should be covered with cloth to wipe off any surplus size, and a brush may be applied above the threads to revolve and finish the same. The position of this brush is indicated by a dotted circle in Fig. 1; or the thread may be passed through between two brushes, so that it is perfectly dressed before it comes to the heddles. In passing from the sizing apparatus the thread is exposed to the action of a fan, *x*, to which motion is imparted through the action of the gear-wheel *x'*, and which causes a current of air to pass through the warp-threads for the purpose of drying the same.

On leaving the heddles the woven fabric passes over the breast-beam *e*, descends beneath a guide-roller, *f*, over the upper roller of the pair of take up rollers *g g*, thence between the same and out below said take-up rollers into the box or receptacle *h*.

The take-up rollers *g g* are made similar to the let off rollers *d d*. The upper roller of each pair is set in rigid bearings and provided with chain-wheels 1 1 and an endless chain, 2, so that a uniform motion of said rollers is insured. The lower roller of each pair is mounted in yielding or adjustable bearings, which are formed upon the cross-bar or yoke *i*, in the center of which is a screw and nut, 3, by which said cross-bar is attached to a cross-piece of the frame *k*, and also adjusted so as to press the rollers to each other more or less. Studs 4 4 pass from the yoke *i* into holes in the cross-piece of the frame by which the yoke and lower roller are guided, and spiral springs around these studs force the yokes with the lower rollers upward against the surfaces of the upper rollers. These yokes and springs may, however, be dispensed with and replaced by set-screws acting on the journal-boxes of the lower rollers. The surface of the rollers prevents the threads or woven fabric slipping through between said rollers, and as the weaving progresses and the lay beats the filling up to a certain position each blow the warp is drawn along a corresponding amount. The let-off rollers are thereby turned and also the take-up rollers moved correspondingly, so that the warp and fabric are kept at the proper tension and the uniformity of the weaving is insured.

The main shaft *l* of the loom is supported by bearings in the frame as usual, and rotated by competent power, and cams *m m*, secured to this shaft, act on the foot-levers *n n* and impart motion to the heddle-frames *o o*. These frames are fitted in slides *o' o'* upon and rising above the main frame, and springs *p p* draw the heddle-frames upward and keep the foot-levers *n n* to the cams *m m*. By fitting the heddle-frames *o o* so as to move in slides, as shown, the heddles, which are to be inserted in these frames in any usual manner, are caused to move in exactly the correct position, and are not subject to the vibration endwise, as ordinary heddles.

The lay *q* is secured to the supports *q'* and driven in the usual manner, either by cams on the shaft *l* or by cranks on the secondary shaft *r*. These shafts *l* and *r* are connected by the gear-wheels *r'*. The lay is to be provided with reeds as usual, and *s s* are the shuttle-boxes at the ends of the lay. 6 6 are the shuttle-drivers sliding on a rod as usual, except that each shuttle-driver is provided with a stud, 7, that projects through a hole in the end of the box, when the shuttle is thrown into the box and carries the shuttle-driver to the end thereof. This projecting stud is acted upon by the swinging driver *t*, from which a pendent stud, 8, descends, to be taken by the lever *u* beneath the lay. This lever is secured on a fulcrum-pin, 9, and it is provided with an arm, 11, that is acted upon by the cam 10 at the opposite points on the shaft, and the shaft *l* revolving once to two vibrations of the lay, the shuttle is thrown from the alternate boxes as follows: As the lay approaches the termination of its backward movement, the cam 10 strikes the arm 11 of the lever *u*, that causes the other end of said lever to move the swinging driver *t* suddenly and powerfully, which, taking the stud 7, projects the shuttle-driver and shuttle, giving to the latter the necessary momentum to cause the stud 7 to throw back the swinging driver *t* on the opposite end of the lay, ready to be acted upon by its lever *u* to send the shuttle back, as before.

The amount of cloth or other fabric made upon the loom is registered by the wheel *y*, upon which are ratchet-teeth, acted on by the pawl 15, that is moved by the link 16 of the lever *y'*, said lever receiving motion from the link 17, attached to a crank-pin on the axis of the roller *g*; and 13 is a stop-pawl, and 14 an index.

The roller *g* is of such circumference that the wheel *y* will indicate correctly the number of yards passing through said rollers *g g*. By these improvements the operation of spooling and warping can be dispensed with, the warp-threads being passed into and through the loom directly from the cobs, and during the operation of weaving a uniform tension of the warp and woven fabric is insured and a fabric of uniform texture is produced.

What I claim as new, and desire to secure by Letters Patent, is—

1. The arrangement of the plate *a*, carrying the spools or cobs, in combination with thread-guides and with the let-off rollers of a loom, constructed and operating substantially as and for the purpose herein shown and described.

2. The combination of the plate *a* with the guide-plate *b*, applied to a loom, substantially in the manner and for the purpose specified.

3. The arrangement of the rollers *d d g g*, two or more at the front and two or more at the rear of a loom, connected together by an endless chain or its equivalent, or without such, and causing the warp-threads and the fabric to progress regularly through the loom as the weaving is performed, substantially in the manner herein set forth.

4. The arrangement of the drivers *t* and levers *u*, acted upon by the cams 10, substantially in the manner and for the purposes specified.

A. FREY.

Witnesses:
LAMARE ALZE,
FABRE LEETOR.